United States Patent [19]

Alverth et al.

[11] Patent Number: 4,632,575

[45] Date of Patent: Dec. 30, 1986

[54] CYLINDER-MOUNTING BRACKET

[75] Inventors: Ronald W. Alverth, Lombard; Donald H. Busam, Oak Forest, both of Ill.

[73] Assignee: The Mako-Tek Corporation, Downers Grove, Ill.

[21] Appl. No.: 773,551

[22] Filed: Sep. 9, 1985

[51] Int. Cl.[4] ............................................. F16C 23/00
[52] U.S. Cl. ..................................... 384/258; 384/259
[58] Field of Search ............... 384/258, 259, 432, 434, 384/433, 256, 273

[56] References Cited

U.S. PATENT DOCUMENTS

| | | | |
|---|---|---|---|
| 1,323,662 | 2/1919 | Vanderley | 384/258 |
| 1,385,135 | 7/1921 | Jones et al. | 384/259 |
| 1,508,007 | 9/1924 | Bowen | 384/259 |
| 4,199,202 | 4/1980 | Maeda | 384/432 |

Primary Examiner—Lenard A. Footland
Attorney, Agent, or Firm—John J. Kowalik

[57] ABSTRACT

A mounting particularly adapted for a shaft of printing press cylinder to position the cylinder in parallelism with a companion cylinder comprising a pair of identical brackets adapted to be mounted on laterally spaced upright supports for holding opposite ends of the shaft wherein one bracket is positionable to be horizontally adjustable and the other vertically and wherein each bracket consists of two parts mating along a parting plane extending in the central axis of a bore defined by opposing semi-cylindrical concavities formed in respective parts when they are connected to each other, the parting plane being so located that each has one end terminating at one side of the axis of the bore and the other end at the other side of the axis so that one part of each bracket may be mounted on its related support and will cradle the respective end of the shaft so that it will not fall out of its concavity and thus the other part of each bracket may be easily assembly with the one part without the necessity of physically holding the cylinder in place.

8 Claims, 5 Drawing Figures

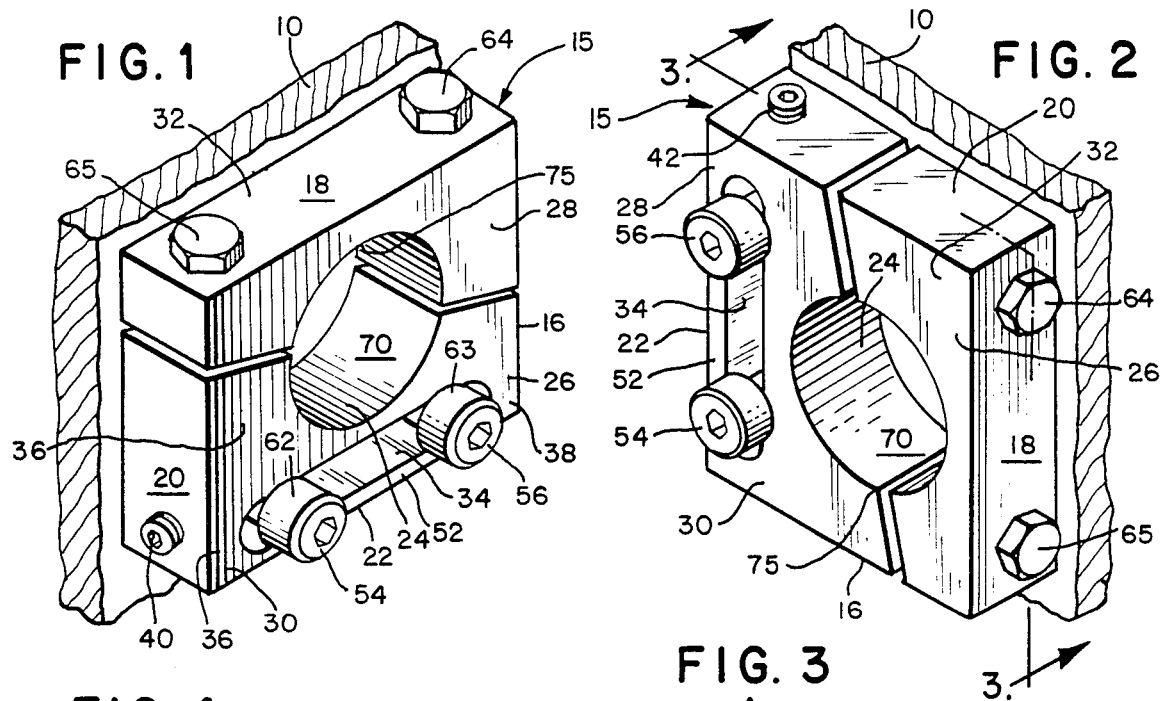
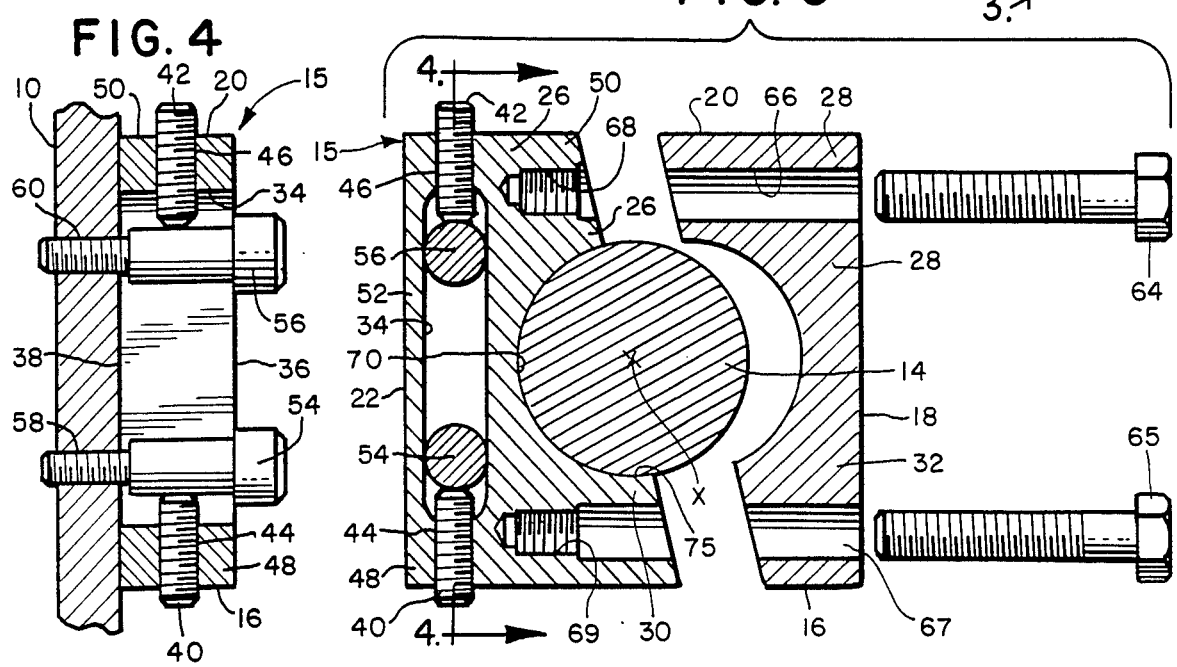
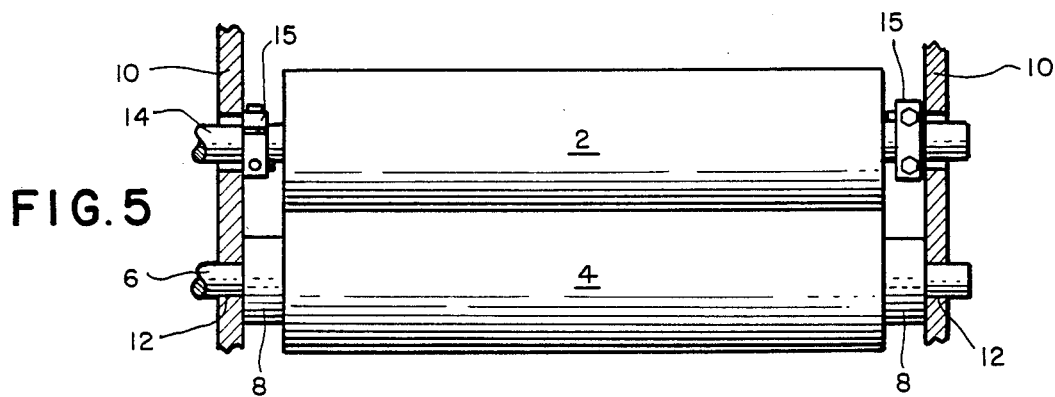

CYLINDER-MOUNTING BRACKET

BACKGROUND OF THE INVENTION

In the art of mounting printing cylinders, which are large and heavy and of substantial length, the installation is tedious and requires two workers.

Basically, in common practice bearing journals are inserted over the ends of the cylinder shaft and the the bearings are bolted to the side supports while the cylinder is held in place. The bolts are aligned with the threaded openings in the supports and tightened. Manipulation of the unwieldy cylinder is nonproductively time consuming and frustrating.

Other devices require parts to be different on one support than the other which must be threaded and unthreaded on the support for moving the cylinder supporting brackets. These are difficult to maintain and require special supports and thereofore have only specific application, and thus are not adaptable to universal use.

SUMMARY OF THE INVENTION

This invention relates to brackets primarily adapted for mounting printing cylinders.

A broad object of the invention is to provide mounting brackets which are relatively simple to manufacture and which provide adjustment vertically as well as horizontally depending on their disposition on associated supports.

A different object is to provide a bracket which is easily adjustable comprising an elongated straight slot formed in the body of the bracket, the bracket being secured to an associated support by bolts extending trough the slot and the bracket being movable lengthwise of the slot on the securing bolts which are abutted by adjusting screws threaded in the body and extending into opposite ends of the slot.

A further object of the invention is to provide a novel bracket mounting for a cylinder and the like in which the bracket is split in a novel manner to maximize support for the roller and at the same time to provide adequate stock to permit bolting of the parts together and to an associated support.

A further object is to provide brackets which may be easily mounted from a pair of upright supports by which a printing cylinder is adapted to be carried, each bracket comprising a pair of complementary sections defining a cylindrical shaft-receiving bore therebetween, one of the sections having an elongated slot extending transversely of the bore for reception of securing bolts therethrough which are threaded into the supports, there being a pair of adjusting screws at opposite ends of the slot for abutment with the bolts, and the screws by threading and unthreading reacting against the bolts and moving the bracket lengthwise of the slot.

Another object of the invention is to provide identical brackets for mounting opposite ends of a shaft of a printing roller or cylinder, the brackets being orientable so that one can be vertically adjustable and the other horizontally so as to position the cylinder in parallelism with an opposing cylinder.

A primary object is to provide such identical brackets each of which comprises two parts which mate along a parting plane of approximately 80 degrees to the vertical whereby the bottom portion of the bearing surface of the sector of the shaft-receiving bore extends slightly beyond the central axis of the shaft mounted thereon while the other bracket which is offset 90 degrees with respect to the vertically adjustable bracket is located to position its parting plane at 10 degrees to the horizontal and the bearing surface thereof is underposed 80 degrees about the shaft in an area under the axis of the shaft and 10 degrees above the axis. Thus one workman alone is able to mount a cylinder on the brackets and then fasten it on by placing one end of the cylinder shaft in the bearing surface of the horizontally adjustable bracket part and then fitting the other end of the shaft into the bearing surface of the vertically adjustable portion over the 10 degree upwardly curving portion extending beyond the vertical plane of the axis of the shaft.

These and other objects and advantages inherent in and encompassed by the invention will become more apparent from the specification and the drawings, wherein:

FIG. 1 is a perspective view of our novel bracket positioned in a horizontally adjustable mode as mounted on an associated support;

FIG. 2 is a perspective view of the bracket mounted in a vertically adjustable mode;

FIG. 3 is an enlarged sectional view with the parts separated taken substantially on line 3—3 of FIG. 2;

FIG. 4 is a cross sectional view taken on line 4—4 of FIG. 3; and

FIG. 5 is a side elevational view of a pair of cylinders incorporating the novel brackets mounted on a pair of supports shown in vertical section.

DESCRIPTION OF THE INVENTION

This invention is illustrated in conjunction, with a pair of press cylinders 2 and 4, the lower cylinder 2 having a center shaft 6 supported at opposite ends on a pair of bearings 8,8 suitably connected or mounted on a pair of side supports or frame members 10,10 of a printing press.

The lower cylinder as shown in the drawings is not adjustable and its horizontally disposed center shaft 6 is shown as having its ends protruding through openings 12, 12 in the supports 10,10 for connection to associated driving components.

The upper cylinder 2 has a center shaft 14, which may be provided with bearings (not shown) for rotatably mounting the cylinder 2.

For purposes of this invention it is of no moment if either cylinder rotates freely or is driven or if one is stationary.

The upper cylinder has its center shaft supported at its ends by identical adjustable brackets 15,15. Each bracket 15 is preferably square in side elevation and has sides 16,18, 20 and 22 and has a center aperture or bore 24 in which an end portion of the shaft 14 is reposed. The bracket is formed of a pair of asymetrical mating sections or portions 26,28 divided by a transverse parting cut or line lying in a diametrical plane passing through the bore 24. The body portion 30 of the section 26 is wider than the body portion 32 of the section 28 although both are of the same thickness and the former has an elongated slot 34 formed therein extending through the lateral sides 36,38 and extending lengthwise substantially parallel with the edge 22.

At the ends of the slot 34 there are provided a pair of adjusting screws 40,42 which are threaded as at 44,46 through the end portions 48,50 which interconnect the body portion 26 with the retainer strip 52.

A pair of bolts 54,56 are inserted through the slot 34 spaced from the ends thereof and are threaded as at 58,60 into the respective side supports 10. The inner ends of the screws, which extend transversely of bolts 54,56, are in contact with the respective thereof and are adapted to be threaded and unthreaded to raise and lower the respective bracket as seen in FIG. 2 or to move it horizontally as seen in FIG. 1. Thus each bracket is identical with the other but depending upon its orientation it either adjusts vertically or horizonzontally.

The bolts 54,56 have heads 62,63, which engage the side 36 and thrust the side 38 against the respective support. It will be noted that the bolts mounting the bracket in FIG. 1 are horizontally aligned and the bolts mounting the bracket in FIG. 2 are vertically spaced and aligned.

The two portions of each bracket are secured to each other about the shaft by bolts 64,65 which extend through opening 66,67 in the body 32 of part 28 and are threaded into threaded apertures 68,69 in the body 30 of part 26.

Thus it will be apparent that after the body part 30 of one bracket, such as shown in FIG. 1 which is oriented for horizontal adjustment, is secured to its support 10, the installer then secures the other bracket part 30 as shown in FIG. 2 for vertical adjustability. The installer then lays one end of the shaft 14 on the body part 30 of the bracket shown in the orientation of FIG. 1 within the upwardly facing semicylindrical sector or concavity 70 of the bore 24 which appears U-shaped in side elevation and then places the other end of the shaft within the laterally facing bore sector or concavity 70 of the part 26 of the other bracket shown in FIG. 2 behind the lower cusp 75 of the sector or concavity 70 which extends beyond the central axis X of the shaft 14. In the position of FIG. 2 and in FIG. 3, the concavity sector 70 appears C-shaped in side elevation.

In view of the orientation of the plane of separation between the parts, the bracket in the position of FIG. 1 provides a nondislodging seat to one end of the shaft and the bracket as oriented in FIG. 3 cups the shaft sufficiently to hold it in place albeit temporarily. However the installer immediately attaches the cap portion 28 to base part 26 of the bracket in FIGS. 2 and 3 and then proceeds to attach the cap part 28 to the base part 26 of the bracket of FIG. 1.

To adjust the left bracket (FIG. 1) the bolts 54,56, which are not initially drawn tight permit the related bracket to slide sidewise within the associated slot 34 as the adjusting screws 40,42 are threaded or unthreaded to align the top cylinder 2 in a horizontal plane with respect to the bottom cylinder 4.

Then the vertical adjustment of the right bracket (FIG. 2) proceeds to raise and lower the respective end of the cylinder 2 until it achieves parallelism. This, of course is achieved by threading and unthreading the screws 40,42 against the bolts 54,56 which have not previously been drawn tight. Bolts 54,56 of both brackets are tightened after the adjustment is completed. Also the bolts 63,64 are tightened, which had been left initially loose.

Having described the invention in its best mode, it will be apparent that to those skilled in the art many variations will now be suggested which are intended to be covered by the appended claims.

We claim:

1. Means for mounting a shaft of a printing press cylinder and the like from a pair of upright supports in parallelism with an associated cylinder comprising:
    a pair of identical brackets each having a base section and a mating clamping section attachable thereto, the mating sections having semi-cylindrical concavities opposing each other in assembled position of said sections and defining a shaft-admitting bore,
    each bracket having means for adjustment horizontally in a first mounted position on its associated support and for vertical adjustment in a second mounted position on its associated support,
    one of said brackets being mounted on one support in said first position and the other bracket being mounted on the other support in said second position,
    each bracket having a parting line between its sections disposed in an axial plane of the bore therein,
    the bracket mounted in the first position having the concavity in its base section facing upwardly and the bracket mounted in said second position having the concavity in its base portion facing laterally and disposing a lower portion thereof in a location sufficient to cup under one end of a shaft placed thereon and hold said shaft within the laterally facing concavity while the other end of the shaft is placed in the upwardly facing concavity of the base portion of the bracket disposed in said first position to facilitate assembly of the clamping sections with the respective base sections.

2. The invention according to claim 1 and each base section having a transverse slot elongated tangentially to its semi-cylindrical concavity, and
    securing means extending through each slot accommodating shifting of the respective bracket lengthwise of the slot,
    and adjusting means on each base section positioned for abutment with the associated securing means for holding the related bracket in adjusted position.

3. The invention according to claim 2 and said securing means comprising a pair of bolts threaded into respective supports,
    and said adjusting means comprising a pair of screws threaded into the base section of each bracket and extending into its respective slot from opposite ends thereof.

4. A bracket for mounting a shaft generally horizontally from an upright support,
    said bracket having a base part and a clamp part, said parts having mating surfaces disposed in a first mounted position of the bracket on the support at an angle to a horizontal plane of more than 90° and less than 180° and in a second mounted position at an angle of less than 90°, each part having a semi-cylindrical shaft-admitting concavity, and the concavities of related parts forming a shaft-receiving cylindrical bore attendant to said parts being secured to each other, and a second bracket identical with the first described bracket,
    said brackets being disposed at opposite ends of the shaft one mounted in the first position and the other mounted in the second position,
    and the base part of the bracket in the said first position having its concavity disposed when viewed in side elevation in a c-shaped configuration and in a second position in a U-shaped configuration.

5. The invention according to claim 4 and said C-shaped configuration terminating in a cusp extending above the nadir of the related concavity.

6. A bracket for mounting a shaft horizontally from an upright support, said bracket having a base part and a clamp part, said parts having mating surfaces disposed in a first mounted position of the bracket on the support at an angle to a horizontal plane of more than 90° and less than 180° and in a second mounted position at an angle of less than 90°, each part having a semi-cylindrical shaft-admitting concavity, and the concavities of related parts forming a shaft-receiving cylindrical bore attendant to said parts being secured to each other, and a second bracket identical to the first described bracket, said brackets being disposed at opposite ends of the shaft one mounted in the first position and the other mounted in the second position, and each base part having an elongated slot disposed in said first position generally vertically and adjustable vertically within the extent of the slot and said slot disposed in the second position generally horizontally and its base part being adjustable within the limits of the slot horizontally.

7. A bracket assembly comprising a pair of elements with complementary engaging faces having opposing semi-cylindrical shaft-admitting concavities defining a cylindrical shaft-admitting bore, and each said concavity terminating in a cusp, the cusp of one concavity in the assembled position of said elements disposed at one side of an axial plane of the bore and the cusp of the concavity of the other element disposed at the opposite side of said plane, and one of said elements comprising a mounting and adjusting slot along one edge extending generally tangentially to the bore for reception of associated securing means, and adjusting means projecting into said slot from opposite ends thereof for abuttment with the associated securing means for shifting the bracket with respect thereto.

8. The invention according to claim 7 and said elements comprising identical bracket assemblies, one said bracket assembly being positionable on one end of an associated shaft with its slot horizontally oriented and the second bracket assembly being positionable on the other end of the shaft with the slot vertically disposed whereby the bracket assemblies are respectively horizontally and vertically adjustable for thus adjusting the shaft.

* * * * *